July 29, 1924.

W. G. DOERN

EVAPORATING APPARATUS

Filed May 17, 1920

1,502,911

Inventor
William G Doern
By Erwin Wheeler & Woolard
Attorneys.

Patented July 29, 1924.

1,502,911

UNITED STATES PATENT OFFICE.

WILLIAM G. DOERN, OF MILWAUKEE, WISCONSIN.

EVAPORATING APPARATUS.

Application filed May 17, 1920. Serial No. 381,818.

*To all whom it may concern:*

Be it known that I, WILLIAM G. DOERN, a citizen of the United States, residing at Milwaukee, county of Milwaukee, and State of Wisconsin, have invented new and useful Improvements in Evaporating Apparatus, of which the following is a specification.

My invention relates to improvements in evaporating apparatus, and is an improvement upon my earlier application, Serial No. 368,357, filed March 24, 1920.

Objects of this invention are to provide an evaporating apparatus in which solutions may be dehydrated to any desired extent and the moisture or water vapor carried away by a continuous stream of air; to provide an apparatus in which the liquid, in the form of a mist or spray, is subjected to currents of heated dried air; to provide an apparatus from which the major portion of the stresses, due to air pressure, are relieved; and to provide an apparatus which is continuous in its operation.

Further objects are to provide an evaporating apparatus in which improved means are provided for retaining the concentrated liquid in the apparatus, and causing a sharp separation of the outgoing moisture laden air, and the resulting concentrated liquid; to provide an apparatus which may operate at an increased rate; and to provide an apparatus which is simple in construction and efficient in operation.

In addition to the above enumerated objects, this invention contemplates the same general objects of those enumerated in my earlier application, more especially for the concentration of milk either for use in that form or as a preliminary to the preparation of milk powder.

In the drawings:—

Figure 2:
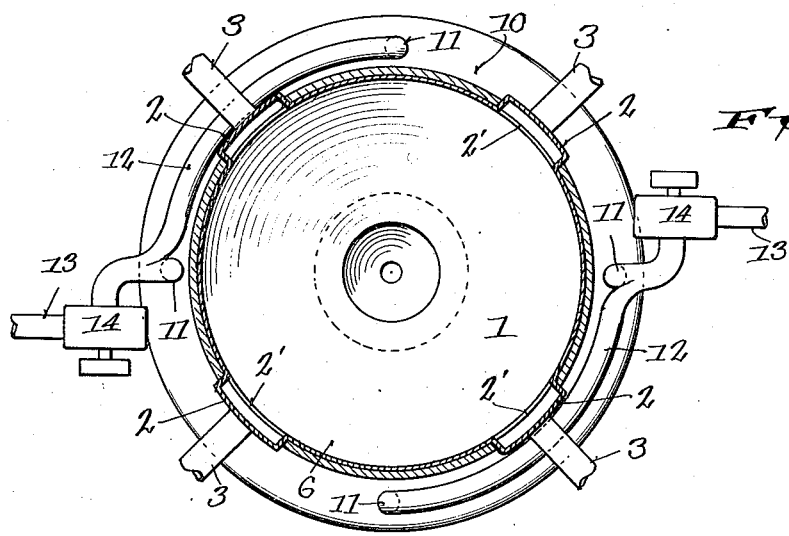
Figure 2 is a horizontal sectional view, taken on the line 2—2 of Figure 1.
Figure 1:
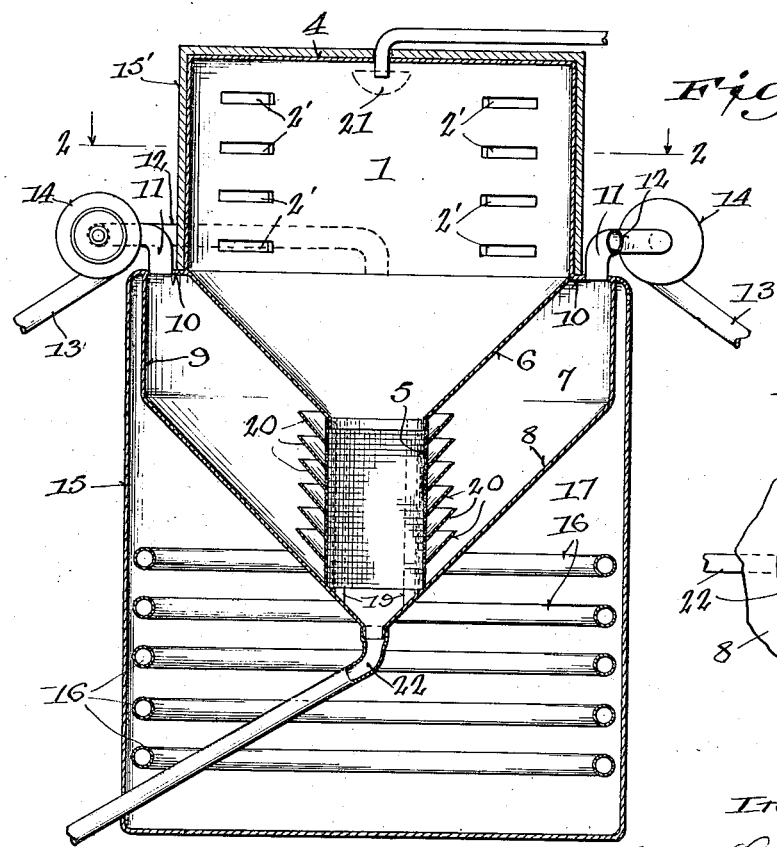
Figure 1 is a longitudinal section view thru the apparatus.

In the ordinary evaporating apparatus it has been found that when it has been attempted to increase the output of these devices by increasing the flow of heated air therethru, that the cells or drying chambers of the device are subjected to pressure in excess of those conveniently borne,—particularly so in devices of large diameters, where a slight increase in air pressure produces a pronounced increase in fiber stress.

By this invention, it is possible to increase the output of the evaporating apparatus without subjecting the parts thereof to increased fiber stress and without increasing the weight of such parts.

The drying chamber or inner cell 1 is a drum to which are joined four ducts 2 which are supplied with heated dried air by means of pipes 3 extending outwardly from the apparatus. These ducts 2 communicate with the interior of the drying chamber 1 by means of a series of rectangular openings 2'. This drum 1 has its top closed by means of the partition 4, and by means of the truncated cone 6 communicates at its bottom with a chamber bounded by a cylindrical net or screen 5.

A second chamber 7 is formed between the cone 6 and the cone shaped member 8 and is in communication with the chamber 1 thru the screen 5. This chamber 7 has a cylindrical wall 9, and has communicating therewith thru its top 10 a series of pipes 11. These pipes may be joined in pairs by means of pipes 12 and each pair connected with a centrifugal exhaust fan 14. The delivery pipes 13 from such fans extend downwardly so that moisture from condensation will not run back into the apparatus.

A casing 15 surrounds the portions 6, 8 and 9. A heat insulating casing 15' surrounds the portion 1 of the device. This provides a heat insulating packing for the chamber 1 and an annular space around the chamber 7. This casing may extend to the base or support of the device, and constitutes a housing for practically the entire evaporating apparatus. Heating coils 16 may be provided in the lower portion of this chamber and may be circular as shown or they may be arranged in a manner shown in my prior application above referred to. It will be seen that these heating coils heat up the air in the chamber 17 and that this heated air keeps the walls of the evaporating chamber and of the chamber 7 heated so that condensation will not take place along these walls.

Figure 3:
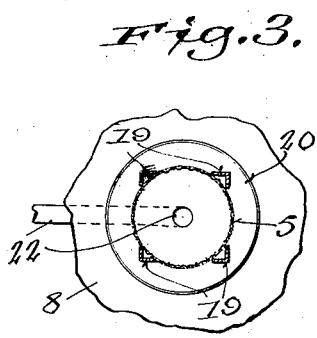
Figure 3 is a fragmentary view, partly in section of the screen and baffle plates in the lower portion of the apparatus.

The screen or cylindrical net 5 may conveniently be of mesh about 6 per inch, and may be formed of metal. To give the requisite stiffness and to provide suitable support for the screen, angle irons 19, Fig. 3, extend upwardly along the outer portion of the screen. These angle irons also serve to unite the walls 6 and 8 and to give additional rigidity and strength to the apparatus. A series of cone-shaped baffle plates 20 are positioned about the screen 5 and serve to catch any moisture that may be blown thru the screen and to cause such moisture to run downwardly to their lower ends and to pass backwardly into the screen.

In the operation of this device the heated dried air is forced through the ducts 2 and into the compartment or evaporating chamber 1. In this chamber the air meets the sprayed liquid which passes outwardly from the sprayer 21 located centrally in the upper portion of the chamber 1. This heated dried air intimately mixes with the mist or spray and passes with such spray downwardly, the flowing stream being gradually constricted by the cone shaped member 6 and passing into the cylindrical net or screen 5. From here the air passes outwardly into the casing 7 and is withdrawn from such casing thru the pipes 11. The liquid, in its concentrated form, passes downwardly into the cylindrical portion 5, a portion of the liquid flowing along the surface of the cone shaped member 6 and along the screen. It is finally collected at the lower end by a pipe 22 located at the apex of the inverted cone 8 and is conveyed from the apparatus by such pipe. By having the cylindrical member 5 positioned as described and shown, it is possible to prevent the entraining of any material quantity of the concentrated liquid by the outwardly flowing air currents. It acts as a guide for the concentrated liquid and prevents scattering or the formation of a finely divided spray in this portion of the apparatus. It is particularly noted that the angle irons 19 join the cones 6 and 8 and serve as braces between such members, thereby greatly enhancing the mechanical or structural qualities of the apparatus. These angle irons also aid in correctly positioning both the screens 5 and the baffles 20.

By having the fans 14 act to exhaust or withdraw the air and vapor from the compartment 7 it is possible to have the effect of an increase in pressure in the ducts 2 inasmuch as the effect of the fans is added to the pressure under which the heated dried air is supplied. However, it is to be noted that at some point between the ducts 2' and the pipes 11, the pressure passes from above atmospheric to below atmospheric, thereby giving one point at atmospheric pressure within the apparatus. This place at which atmospheric pressure occurs may be caused to be located at any desired point in the evaporating apparatus by properly proportioning the pressure at which the heated dried air is supplied and the suction created by the fans 14. It may, for instance, be conveniently caused to occur at about the bottom of the cone shaped member 6.

By this arrangement of pressures and by this design of apparatus, it is possible to greatly increase the output of the device and at the same time to keep the pressures within the device at a safe point.

It will be seen that an efficient evaporating apparatus has been provided which will concentrate a large quantity of liquid within a given time and in which the pressures employed are kept within safe limits. It will further be noted that the mechanical formation of the apparatus is such that it may be readily made and that its parts will have great strength.

It will further be seen that by having the pressure within the evaporating apparatus reduced evaporation is promoted, that is to say, vaporization occurs at a greater rate in this reduced or rarified atmosphere than it would occur in an atmosphere under compression.

I claim:

1. In an evaporating apparatus for concentrating liquids, the combination with an evaporating chamber provided with ported side walls and a converging bottom providing a constricted opening, of a casing surrounding the converging bottom and spaced therefrom, said casing having a converging bottom conforming to the bottom of the evaporating chamber, a screen surrounding the opening and connected with the converging bottom of the evaporating chamber and the bottom of the casing, a plurality of inverted cone-shaped baffle plates surrounding the screen, means for supplying heated dried air to the evaporating chamber through the ports therein, and means for injecting liquid to be concentrated into the chamber.

2. In an evaporating apparatus for concentrating liquid, the combination with an evaporating chamber provided with ported side walls and a converging bottom providing a restricted opening therethrough, of a casing surrounding the converging bottom and spaced therefrom, said casing being closed at its top, and a screen surrounding the opening and connected with the converging bottom and with the casing, a plurality of baffle plates surrounding the screen, means for admitting heated dried air into the evaporating chamber through the ported side walls, means for injecting a liquid into the chamber, means connected with the space between the evaporating chamber and casing for withdrawing air therefrom.

3. In an evaporating apparatus for concentrating liquid, the combination with an evaporating chamber closed at its top and having a converging bottom providing a constricted opening therethrough and side walls provided with a plurality of ports, of ducts connected with certain of said ports for supplying heated dried air to said chamber, means for injecting liquid through the top of the chamber, a casing disposed about the bottom of the evaporating chamber to provide air space and closed at its top, a perforated cylinder connected with the bottom and communicating with the evaporating chamber through said opening, a plurality of inverted cone-shape baffle plates surrounding the cylinder, and means connected with the top of the casing for withdrawing air from the air space.

4. In an evaporating apparatus for concentrating liquid, the combination with an evaporating chamber having a closed top and a converging bottom provided with a centrally disposed opening, said chamber having side walls provided with a plurality of ports arranged in series, the ports of each series being disposed one above the other; of ducts, each of said ducts being connected with one of said series of ports; means for supplying heated air to said chamber, said means being connected with said ducts; means extending through the top of said chamber for injecting fluid thereto; a casing disposed about the converging bottom and spaced therefrom to provide an air space, said casing being closed at the top; a screen disposed about the opening in said bottom and extending between the bottom and the casing; a plurality of baffle plates disposed about the screen and arranged one above the other in spaced relation; vacuum producing means connected with the top of said casing and communicating with the space therein; and a pipe connected with the casing and communicating with the space therein interiorly of a screen, whereby liquid injected into the evaporating chamber will be condensed therein and caused to flow along the screen to the bottom of the casing and out through the pipe.

5. In a device of the character described, the combination with a cylindrical receptacle, of a heating coil disposed in the lower portion of said receptacle about the wall thereof, a second receptacle having a downwardly converging bottom wall portion terminating in a port and disposed within the heating influence of said coil, a pipe leading from said port through said coil and outwardly of said first mentioned receptacle, a third receptacle having a major portion above said second receptacle and having a downwardly converging wall portion within said second receptacle and terminating in a port substantially in axial alignment with the port of said second receptacle, a cylindrical screen peripherally connected with said second and third receptacles about said ports, means for withdrawing air from said second receptacle and means for admitting air and liquid to said major portion of said third receptacle.

In testimony whereof I affix my signature in the presence of two witnesses.

WILLIAM G. DOERN.

Witnesses:
J. Moss,
R. Weber.